United States Patent [19]

Levine et al.

[11] Patent Number: 5,347,322
[45] Date of Patent: Sep. 13, 1994

[54] VIDEO STORAGE AND SYNCHRONIZATION

[75] Inventors: Abby P. Levine, New York, N.Y.;
Barry H. Minnerly, Rowayton, Conn.

[73] Assignee: Rebo Research, New York, N.Y.

[21] Appl. No.: 53,295

[22] Filed: Apr. 23, 1993

Related U.S. Application Data

[63] Continuation of Ser. No. 727,480, Jul. 9, 1991, abandoned.

[51] Int. Cl.⁵ .............................................. H04N 9/64
[52] U.S. Cl. ...................................... 348/718; 348/722
[58] Field of Search ............. 358/160, 22 CK, 22 PP, 358/183, 148, 149, 185, 30, 28, 27; 348/718, 719, 722; 345/200; H04N 5/14, 9/64

[56] References Cited

U.S. PATENT DOCUMENTS

| | | | |
|---|---|---|---|
| 3,900,885 | 8/1975 | Tallent et al. | |
| 3,986,204 | 10/1976 | Smith | 358/22 CK |
| 4,018,990 | 4/1977 | Long et al. | |
| 4,063,284 | 12/1977 | Tatami | |
| 4,095,259 | 6/1978 | Sawagata | |
| 4,118,738 | 10/1978 | Arnstein | |
| 4,134,131 | 1/1979 | Hopkins, Jr. | |
| 4,532,541 | 7/1985 | Cooper | |
| 4,580,165 | 4/1986 | Patton et al. | 258/149 X |
| 4,646,151 | 2/1987 | Welles, II et al. | |
| 4,677,499 | 6/1987 | Shirota et al. | |
| 4,689,676 | 8/1987 | Nakajima et al. | 358/149 |
| 4,774,578 | 9/1988 | Kick | 358/185 X |
| 4,802,025 | 1/1989 | Shinada | |
| 4,841,379 | 6/1989 | Akiyama | |
| 4,858,011 | 8/1989 | Jackson et al. | 358/185 X |
| 4,862,269 | 8/1989 | Sonoda et al. | |
| 4,916,541 | 4/1990 | Hashimoto et al. | |
| 4,964,069 | 10/1990 | Ely | 358/149 X |
| 4,991,019 | 2/1991 | Enami et al. | 358/185 X |
| 5,027,212 | 6/1991 | Marlton et al. | 358/149 X |
| 5,034,817 | 7/1991 | Everett, Jr. | 358/160 |

OTHER PUBLICATIONS

Brochure entitled "Re: Facts ReStore ™ Computer-based HDTV Framestore" distributed by Rebo Research, Inc. copyrighted 1989.
Brochure distributed by Rebo Research, Inc. pertaining to "ReStore", copyrighted 1990.

*Primary Examiner*—Victor R. Kostak
*Attorney, Agent, or Firm*—Lerner, David, Littenberg, Krumholz & Mentlik

[57] ABSTRACT

A video storage and synchronization system has one of more frame memories and an output buffer providing a selectable delay. Incoming video signals are digitized and routed to the memories and/or to the buffer. Stored signals are read out from the memories in synchronism with the incoming signals and can be mixed with the incoming signals before processing in the output buffer.

27 Claims, 1 Drawing Sheet

VIDEO STORAGE AND SYNCHRONIZATION

This is a continuation of application Ser. No. 07/727,480 filed Jul. 9, 1991 now abandoned.

FIELD OF THE INVENTION

The present invention relates to the field of television, and the more particularly relates to video signal storage and synchronization devices.

BACKGROUND OF THE INVENTION

In television production, it is often desirable to synchronize two or more television signals from separate sources precisely with one another to produce a composite image or for other purposes. For example, the image of a television reporter may be superimposed over an image associated with the story which he is discussing. Techniques for superimposing one image over part of another image, commonly referred to as "keying" are well known in the television art. These techniques however require precise synchronization between the two signals to be combined.

The need for synchronization arises from the nature of television signals. In an ordinary television monitor, the image is created by sweeping an electron beam across the surface of a phosphor screen in a predetermined pattern or "raster", usually a pattern of parallel horizontal lines. The information defining the picture is provided in "rasterwise" order. That is, the brightness values for various points on the screen follow one another in the video signal in the same sequence as the beam crosses those points in tracing the predetermined pattern on the screen. As the beam reaches each point on the screen, its intensity, and hence the brightness of the light emitted by the screen at that point are controlled in accordance with the brightness value in the signal. In many common television systems, the raster is "interlaced" so that the beam first traces a series of "even" horizontal lines spaced one line apart from one another over the full vertical extent of the screen, then returns to the top of the screen and traces another series of "odd" horizontal lines in the spaces between the even lines. The even lines are commonly referred to as one "field" of the picture, whereas the odd lines constitute another field. The even and odd fields together constitute one "frame", i.e., a complete picture.

In many situations, such as in television studio productions, it is essential to combine several video signals from different sources. The video information representing the same point in the raster must be presented to the combining device at the same time. Each field of the two video signals to be combined must start at the same time, and each line in each signal must start at the same time as a line in the other signal.

To a certain degree, this synchronization can be achieved by synchronizing the various video signal sources, such as the various video cameras in a studio, to a synchronization signal from a master source in the studio, commonly referred to as a "genlock" signal. However, the signals passing from the various sources to a combining device are subject to delays in propagation through cables and intermediate signal processing devices. Differences in the delays encountered by various signals within a studio can affect the synchronization. Although these differences in delays may be as small as a few microseconds, they have an appreciable affect on the image. In a typical high definition television system, an entire line is traced in about thirty microseconds, so that a signal which is out of synchronization by ten microseconds would be shifted by about one-third of a line. If two signals out of synchronization by this amount were combined with one another, the resulting picture defect would be clearly visible to the viewer. Analog delay lines may be provided at the signal inputs of the combining device to alleviate these effects. These can be adjusted to match the delays encountered by the various signals and thus achieve precise alignment between the starting times of the lines in the various signals, commonly referred to as "H phase synchronization". These devices are troublesome and normally do not provide satisfactory results with high definition television signals.

Television signals may be handled and stored in digital form. The brightness information constituting each line is converted into a series of values, referred to herein as "pixel values" each representing the brightness of one pixel. In monochrome systems, each pixel value may consist of one byte specifying brightness. In certain color television systems, each pixel value may include several separate bytes of digital information, each representing the brightness of one primary color. In other color television systems, one or more bytes of a pixel value may represent the overall luminance of the pixel, whereas one or more additional bytes may represent the chrominance value. These pixel values can be stored in a digital memory, read out from the digital memory in rasterwise order and reconverted to an analog signal for display on a video monitor. Computer special effects systems can create images by computing the series of pixel values which, when read out and displayed, will result in a picture representing an artificial image. Similar systems can modify the pixel values representing a real image captured by a video camera and thereby modify the image. Because the video signal for a complete image includes a large amount of information, a memory for storing a complete frame of video information must have a substantial capacity, typically several megabytes. Such a memory must be capable of storing and retrieving the information at very high rates. Full frame video memories therefore are relatively costly devices.

Considerable efforts have been made in the art heretofore toward development of video signal synchronization devices using digital elements.

Long et al., U.S. Pat. No. 4,018,990 adjusts the timing of a video signal by converting the video signal from analog to digital format and then clocking the digitized video information through a shift register and into a small random access memory using clock pulses synchronized to the incoming video signal. The signal is read out from the random access memory using clock pulses synchronized to an external source. The delay encountered by the incoming video signal in passing through this system can be adjusted by selecting a relatively short path through the shift register or a relatively long path. Thus, the delay encountered by a signal passing through the system can be adjusted to compensate for transmission line delays and the like. Shirota et al, U.S. Pat. No. 4,677,499 likewise uses a shift register as a digital delay line, and takes video signals from various points along the shift register to vary the path length and hence the delay time encountered by the video signal in passing through the register.

Cooper, U.S. Pat. No. 4,532,541 utilizes charge coupled device (CCD) analog shift registers as delay lines.

The incoming signal is written to three such devices and the signal is clocked out from each such device in accordance with an output clock having the desired synchronization. The three CCD devices are shifted alternatively from write mode to read mode so that at any given time one device is always in write mode and accepting incoming signals whereas another device is always in read mode, and is discharging the previously written signals. Arnstein, U.S. Pat. No. 4,118,738 converts the incoming signal to a pulse train form, transmits the resulting pulse train through a digital delay line having multiple taps, and varies the delay encountered by the signal by selecting the appropriate tap from the delay line.

Tallent et al, U.S. Pat. No. 3,900,885 uses a set of three line memories in a frequency correction device. The incoming signals are digitized and written into the line memories in sequence at a writing rate synchronized with the incoming video signal. The signals are read out of these line memories either at a rate derived from a master reference signal or at a rate derived from the incoming video signal itself. In an alternate mode of operation, the digitized signals are routed around the line memories and the line memories are disabled.

Hopkins, Jr., U.S. Pat. No. 4,134,131 synchronizes video signals by reading them into and out of a full field memory or full frame memory. The incoming signals are digitized and the resulting pixel values are written into the memory and read out from the memory according to read and write signals synchronized with the master timing or genlock signal. The incoming signals are retained briefly in a buffer until a write signal occurs. Hashimoto et al, U.S. Pat. No. 4,916,541 discloses a video picture processing system incorporating a field memory together with input and output buffers.

Akiyama, U.S. Pat. No. 4,841,379 describes yet another system using a large memory with a write clock synchronized to the incoming signal and a read clock synchronized to a master signal.

Wells, II et al, U.S. Pat. No. 4,646,151 describes a system in which an incoming video signal is digitized and the resulting pixel values are written to first in first out or "FIFO" registers. The pixel values are written from the FIFO registers into a frame buffer memory and read out from the frame buffer memory to provide the output. The reading and writing operations are synchronized with the master synchronization signal. If the timing of the incoming video signal differs from the master synchronization signal, the difference will be corrected as the signals pass through the FIFO registers and encounter varying delays therein.

Sawagata, U.S. Pat. No. 4,095,259 discloses a video synchronization system using line buffer memories, with digitized video being written into the line buffers in synchronism with the incoming video signal and read out from the line buffers in synchronism with the master signal.

Tatomi, U.S. Pat. No. 4,063,284 discloses another system using shift registers with a write clock synchronized to the incoming signal and a read clock having a standard or master frequency. Sonoda, et al, U.S. Pat. No. 4,862,269 discloses another system using a memory with read in at a rate synchronized to one video signal and read out synchronized to another, master video signal.

Shinada, U.S. Pat. No. 4,802,025 discloses a video synchronizer using a pair of field memories and an interleaved reading and writing scheme. At any given time, the digitized incoming signal is written into one of the field memories whereas the outgoing signal is generated by reading data from the other field memory. Data writing is conducted according to clock signals synchronized with the incoming signal, whereas data is read out from the memory according to read clock signals synchronized with the master synchronization signal. This general scheme has been used in the high definition television art. Although this system provides effective synchronization, it is costly and is not particularly versatile. Thus, the memories included in such a system simply act as a synchronizers and perform no other function.

Despite all of these efforts towards improvements in video digital processing and synchronization, there are still needs for further improvement. In particular, there have been needs for video signal processing systems which can be used for several different functions including signal synchronization, mixing and frame storage, but which provide these functions at relatively low cost.

SUMMARY OF THE INVENTION

One aspect of the present invention provides a video frame storage and synchronization system for processing digital video signals which include a series of pixel values in raster order. A system in accordance with this aspect of the present invention desirably includes a system digital input connection for accepting an incoming digital video signal and a first memory. First memory write means are provided for writing pixel values into the first memory and first memory read means are provided for reading pixel values from the first memory sequentially, in the preselected raster order. Typically, the pixel values are provided as a series of lines, each such line including a beginning pixel value.

The system further includes timing means for synchronizing the first memory reading and writing means with the incoming digital video signal so that each pixel value is read out from the first memory simultaneously with the corresponding pixel value of a field in the incoming digital video signal. Thus, the beginning pixel value of each line read from the first memory means is provided simultaneously with a beginning pixel value of a line in the incoming digital video signal. Most preferably, the system also includes digital buffer means having a buffer input and a buffer output for accepting successive pixel values in order as presented at the buffer input and discharging pixel values in the same order at the buffer output, the digital buffer means being arranged to provide a time delay between acceptance and discharge of each such pixel value. Means are provided for adjusting the time delay provided by the digital buffer means. Desirably, the system also includes routing means for selectively routing digital video signals from the system input connection to the first memory write means, to the buffer input or both, and for selectively routing digital video signals from the first memory read means to the buffer input.

The first memory most preferably has capacity sufficient to store pixel values constituting a full frame of the digital video signal, and the first memory read means desirably is operative to read successive lines of pixels in the preselected raster order so that the pixels read out from the first memory are supplied as full frames with the lines therein arranged in the raster order. In this case, the timing means desirably is operative to synchronize the first memory read means with the incoming video signal so that the first line of each field in each frame read out from the first memory means is provided simultaneously with the first line of a field in the incoming video signal. Preferably, the first memory write means and first memory read means are operative to write and to read pixel values to and from particular locations within the first memory and to vary these locations according to fixed, ordered patterns such that the locations repeat in the same order within each field and frame of pixel values read and written. Thus, the pixel value corresponding to any particular point in the raster is always written into and read out from a particular location within the first memory.

The timing means preferably includes means for providing a first clock signal coordinated with the timing of the incoming digital video signal, and means for controlling operation of the first memory read means responsive to this first clock signal. Most preferably, the system also includes analog to digital conversion means for accepting video signals in analog form, converting these analog signals to a stream of digital pixel values in synchronism with the first clock signal and supplying this series of pixel values to the system digital input connection. The means for providing a first clock signal desirably includes means for accepting an external timing signal and controlling the first clock signal responsive to the external timing signal. Most preferably, the means for accepting an external timing signal includes means for detecting one or more timing signals, commonly referred to as synchronization or "sync" signals incorporated in the analog video signals.

The routing means preferably includes a mixer having a plurality of mixer inputs and means for mixing pixel values supplied to these mixer inputs with one another to obtain combined pixel values, the mixer being connected to supply the combined pixel values to the buffer input. Thus, the routing means includes means for selectively routing pixel values from the system input connection and from the first memory read means to the mixer inputs. The system may also include a second memory, second memory write means for writing pixel values into the second memory and second memory read means for reading pixel values from the second memory, the timing means being arranged to synchronize the second memory read means with the incoming digital video signal in substantially the same way as discussed above with reference to the first memory read means.

Most desirably, each of the memories is provided with random write means for accepting pixel values along with write address data denoting locations within the appropriate memory, and for writing the pixel values into that memory at the location denoted by the write address data. Random read means may be provided for accepting read address data denoting locations in the memory and retrieving the pixel values from such locations. These random read and write means may be used for modifying the pixel values held in the memories. Typically, these random read and write means are arranged to accept and deliver address data and pixel values on a computer data bus. These features are used to connect the system to a computer for computer modification of the pixel values as desired to achieve artistic effects.

Preferred systems according to this aspect of the invention provide extraordinary versatility and capabilities for both synchronizing and processing video signals. The buffer means and time delay adjusting means serve to synchronize video signals routed directly from the digital video input or signals taken from the memories with a master or "genlock" signal, and hence synchronize these signals with other signals in the studio. There is accordingly no need to alter or adjust the timing of the readout from the memories to achieve synchronization. Moreover, there is no need to use the memories in a continual reading and writing cycle merely to achieve synchronization. Therefore, the memories can be used to store frames as required. Because the memories need not be continually overwritten, the pixel values in the memories can be modified by external computer editing systems. Moreover, because the readout from the memories is synchronized with the incoming signal, rather than with the system output or master signal, it is easy to combine signals from the memories with incoming video in the mixer. There is no need for any intermediate synchronization step. Stated another way, the system performs operations such as freeze-frame, frame modification and multi-frame mixing on the incoming video signal, before adjusting the timing of the incoming signal in the proper means. By using the buffer means to synchronize the resulting output signal as required for use, the system avoids the needs for separately adjusting memory and input signals into synchronism with one another. Because there is no need to vary the timing of the frame readout from the memories, the construction and operation of the memories can be simple and straightforward.

Further aspects of the present invention include methods of storing and processing video signals. Preferred methods according to this aspect of the invention include the steps of accepting incoming digital video signals and selectively routing the incoming digital video signals to a first memory, to the input of a buffer or both. Methods according to this aspect of the present invention preferably also include the steps of reading digital video signals from the first memory in synchronism with the incoming digital video signals so that the lines, and preferably the fields, of the digital video signals read out from the memory are synchronized with the incoming digital video signal. The methods preferably also include the steps of selectively mixing video signals read out from the memory with the incoming video signals, and supplying the resulting mixed signals to the input of the buffer. The method may further include the step of passing the video signals through the buffer to a buffer output and delaying the video signals in such passage as required to achieve synchronization of the video signals at the output with an external master signal. The methods may further include the step of accepting incoming analog video signals and converting the same to digital video signals and recovering a synchronization signal included in the incoming analog video signals so as to synchronize the memory read out with the incoming signals.

These and other objects, features and advantages of the present invention will be more readily apparent from the detailed description of the preferred embodiment set forth below, taken in conjunction with the accompanying drawings.

DETAILED DESCRIPTION OF THE PREFERRED EMBODIMENT

Figure 1:
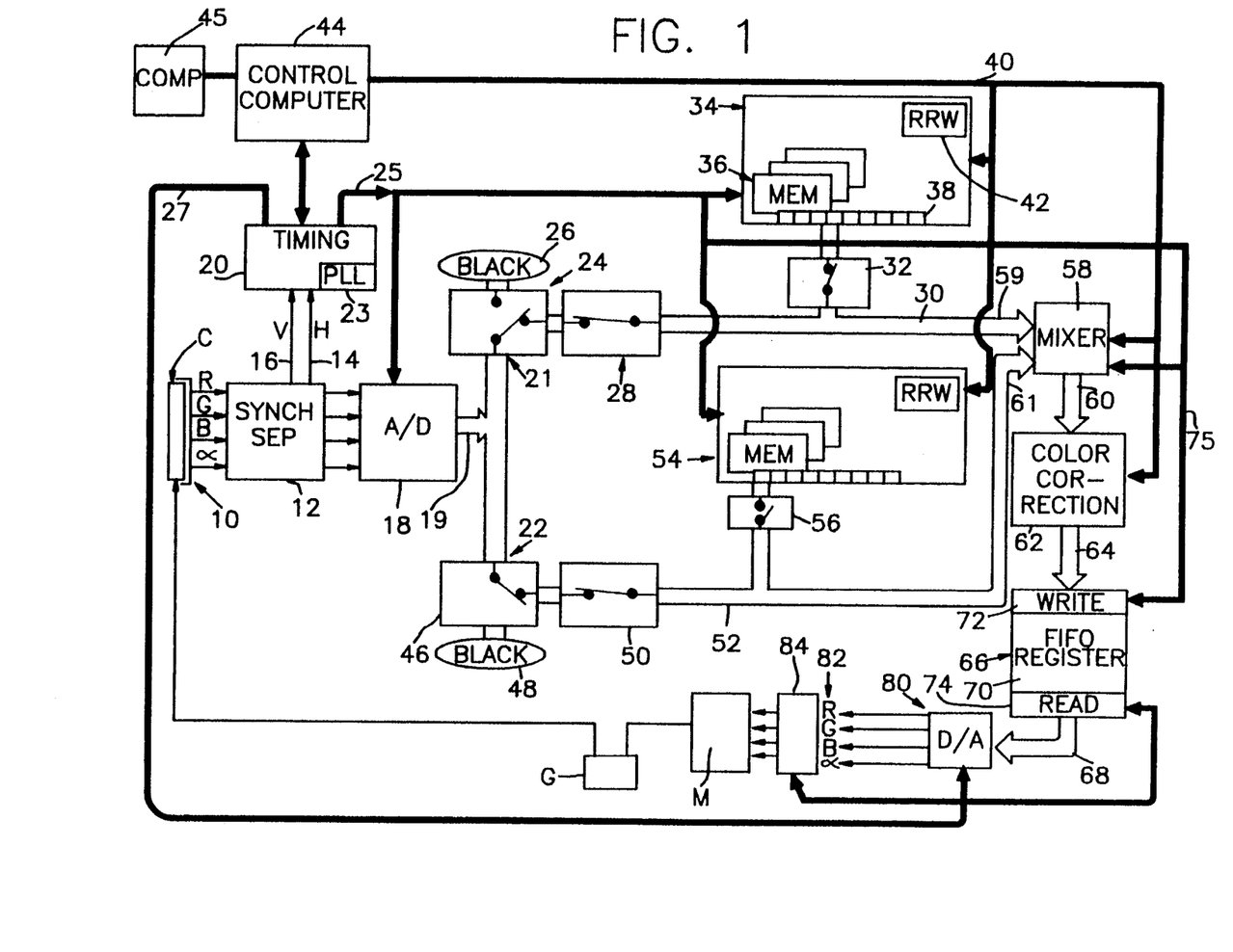
FIG. 1 is a functional block diagram showing the functional elements a system in accordance with one embodiment of the present invention.

A system in accordance with one embodiment of the present invention includes an analog input connection 10 having four separate channels for receiving four component channels (red, green, blue and alpha) of a composite analog video signal of the type normally used in a known analog high definition television system commonly referred to as 1125/60 HD TV, according to Society of Motion Picture and Television Engineers Standard 240M. Signals according to the 1125/60 system are arranged in a raster of 1125 lines per frame, each frame including two fields of 562½ lines each with a vertical retrace interval of 90 lines between the active video or information bearing portions of sequential fields. Thus, each field includes about 472 lines of active video information. The half line in each field occurs the vertical retrace interval. There is a vertical synchronization pulse in the first line of each field and a horizontal synchronization pulse at the beginning of each line.

A synchronization separator 12 is connected to analog input connection 10. Separator 12 is arranged to detect the vertical and horizontal synchronization pulses in the incoming signal and to provide separate output signals through connections 14 and 16 representing the horizontal and vertical synchronization pulses. The video information passes through synchronization separator 12 unchanged. An analog to digital convertor 18 is arranged to receive the video signals from synchronization separator 12. A timing unit 20 including a phase locked loop or "PLL" oscillator 23 is connected to the synchronization pulse outputs 14 and 16 of sync separator 12. Phase locked loop oscillator 23 is locked to the horizontal synchronization pulses output by sync separator 12, so that the phase lock loop operates at the same frequency as, and in phase with, the horizontal synchronization pulse train from the sync separator. Timing unit 20 is arranged to generate a set of first or input clock signals synchronized with the output of the PLL oscillator and hence synchronized with the incoming video. These first clock signals include start-of-line clock signals synchronized with the horizontal synchronization pulses in the incoming video. The first clock signals also include a first pixel clock signal recurring on a regular pixel clock cycle, such that each pixel clock cycle corresponds to a predetermined fraction of the interval line between clock signals. Preferably, the timing means is arranged to execute 1920 pixel clock cycles for each line clock cycle. The timing means is also arranged to generate start-of-field clock signals also coordinated with the line clock signals such that there are 562.5 line clock signals for each start-of-field clock signal. The start-of-field clock signals are coordinated with the vertical synchronization pulses from sync separator 12 so that each start-of-field clock signal is coincident with a vertical synchronization pulse of the incoming signal. The timing means is arranged to inhibit the pixel clock signal during intervals each including a preselected number of pixel clock cycles, and each starting at a predetermined time with respect to a start-of-field clock signal. These intervals correspond to the vertical retrace intervals of the incoming analog video signal. Timing means 20 is also arranged to inhibit the pixel clock signal for similar but shorter intervals corresponding to the horizontal retrace intervals of the incoming analog video signal.

Timing device 20 also provides an output clock signal which is an exact replicate of the first or input pixel clock signal discussed above, but which is delayed by an arbitrarily chosen delay time, corresponding to a predetermined number of pixel clock cycles. Typically, this arbitrarily chosen delay time can be set to about one half a horizontal line interval, or about 1,000 pixel clock cycles. The output clock signal, like the first or input pixel clock signal, occurs once on every pixel clock cycle except during intervals corresponding to the vertical and horizontal blanking intervals of the incoming video signal. However, because of the output clock signal is delayed with respect to the pixel clock signal, these intervals in the output clock signal are likewise delayed. Therefore, at the beginning of each vertical blanking interval in the incoming signal, the pixel clock signal ceases immediately whereas the output clock signal ceases after this arbitrarily selected delay time. Likewise, at the end of each vertical blanking interval in the incoming signal, the first or input pixel clock signal resumes immediately, whereas the output clock signal resumes after this delay time.

Timing device 20 is also arranged to provide output start-of-field and output start-of-line signals which are exact replicates of the first or input start-of-field and start-of-line signals discussed above, but which are delayed relative to these signals by the same arbitrarily selected delay time as discussed above with respect to the output clock signals. The timing device supplies the first or input signals (input pixel clock, input start-of-line and input start-of-field) on a first set of timing control lines 25, and supplies the output signals (output clock, output start-of-line and output start-of-field) on a second set of timing control lines 27.

Analog to digital convertor 18 is arranged to receive timing signals from timing unit 20. Convertor 18 is arranged to sample the magnitude of each of the red, green, blue and alpha components in the incoming analog video signal once for each pixel clock signal, and to convert each such sample into a separate 8 bit byte. This provides a composite pixel value including four such bytes in parallel, or 32 bits in all. The output from the convertor 18 constitutes the digital video signal input 19 for the system. Digital signal input 19 is connected to a pixel value bus including a first branch 21 having a downstream end 30 and a second branch 22 having a downstream end 52. The upstream end of first branch 21 is connected to one input of a switch 24. The other input of switch 24 is connected to a source 26 of constant, all zero pixel values representing a pure black signal. Switch 24 is arranged so that its output can be connected either to the upstream end of first branch 21 and hence to digital signal input 19 or to black source 26. The output of switch 24 is connected through a further switch 28 to the downstream end 30 of the first branch. Downstream end 30 in turn is connected via a switch 32 to the pixel value input of a first frame memory 34 so that pixel values passing along downstream end 30 can be transferred to and from frame memory 34 via switch 32. Each of switches 24, 28 and 32 is connected to receive control signals from a data bus 40, the connections between the switches and the data bus being omitted for clarity of illustration in FIG. 1.

Frame memory 34 per se may be a substantially standard video assembly capable of storing a full frame of 32 bit pixel values. The frame memory includes an array of random access memory cells 36 having at least about 8 megabytes capacity and therefore capable of accommodating the 1,987,200 pixel values constituting the active video information in a full frame. In the standard fashion, memory array 36 has addresses, i.e., discrete locations within the memory array at which the actual data is stored. Frame memory 34 also includes a pixel value input/output or read/write unit 38 including a register for receiving pixel values in series and, once the register is filled, transferring all such pixel values into preselected addresses in memory 36 simultaneously. Read/write apparatus 38 is also arranged to retrieve pixel values from a block of addresses in memory array 36 simultaneously and clock out or discharge these pixel values in series. Read/write unit 38 is arranged to receive control signals along a data bus 40 and to operate either in a read mode or a write mode as commanded by such data signals. Read/write unit 38 is arranged to address locations within memory array 36 on a repetitive cyclic pattern beginning with a starting location such that the pattern repeats after reading or writing a number of pixel values equal to one full frame of active video information. Thus, the pixel value for any given point in the raster is always read to or written from the same location within memory array 36.

Read/write unit 38 is also connected to receive the first clock signals from timing unit 20. In its write mode, read/write unit 38 is arranged to receive or clock in pixel values sequentially from switch 32 such that one such pixel value is accepted or clocked in for each pixel clock signal from timing unit 20. Read/write unit 38 is also synchronized with the field and line clock signals from timing unit 20 so that in the write mode the first block of pixels following a first start-of-field signal will be written to the starting location in memory array 30. In this manner, the pixel values constituting the first line of each frame are stored in locations reserved for the first line of a frame. Read/write unit 38 starts its repetitive location selecting cycle in the write mode once for every two field clock signals, and hence returns to the starting location once each frame.

Read/write unit 38 is also arranged to operate according to the first or input timing signals from timing unit 20 while in the read mode. Just as in the write mode, read/write unit 38 addresses the location for the first line of a frame, once for every other start-of-field signal. Read/write unit 38 discharges or clocks out pixel values in synchronism with the pixel clock signal and line clock signals from the timing unit 20 so that the first pixel of a line is clocked out on the first pixel clock cycle following each start-of-line clock signal.

Frame memory 34 further includes a random access unit 42 arranged to receive memory addresses and commands from data bus 40, and also to receive and transmit pixel values along the data bus. Random access unit 42 is arranged to write pixel values into any location within memory array 36 or to read pixel values from any such location as commanded by the commands and address data supplied through the data bus. Random access unit 42 operates asynchronously, i.e., without reference to the timing signals from timing unit 20. As is standard in video memory assemblies having both a mass read/write device 38 and a random access unit 42, appropriate means (not shown) are provided for detecting conflicts between the two and controlling the random access unit so that it does not attempt to read from or write to a particular location within memory 36 while that location is being addressed by read/write means 38.

Data bus 40 may be a standard arrangement such as a bus of the type provided under the registered trademark NUBUS by Texas Instruments, Inc., or in accordance with a variant of that design of the type used in computers sold under the registered trademark MACINTOSH by Apple Computer Corporation. A microprocessor 44 and an external computer 45, which may be of the aforementioned MacIntosh type, are linked to bus 40. As discussed further below, microprocessor 44 is programmed to send appropriate control commands to certain components of the system in response to commands from external computer 45. Computer 45 is also arranged to receive pixel values transmitted along bus 40 in the known manner for computer graphics operations, to generate modified pixel values and to transmit the same along the bus 40.

The system further includes a second set of components including a switch 46, black signal generator 48 and further switch 50 connected between the upstream end of second branch 22 of the pixel value bus and the downstream end 52 of that branch in the same way as the corresponding switch 24, black signal generator 26 and switch 28 are connected between first branch 21 and downstream branch 30. A second frame memory 54 is connected to downstream branch 52 through a switch 56, second frame memory 54 and switch 56 being substantially identical to first frame memory 34 and switch 32 discussed above.

The system further includes a mixer 58. Mixer 58 has a first input 59 connected to downstream section 30 of the first branch 21 of the pixel value bus and has a second input 61 connected to the downstream section 52 of the second branch 22 of the pixel value bus. Mixer 58 is arranged to take in one pixel value from each input 59 and 61 and to provide a resultant pixel value through an output 60 for each input pixel clock signal from timing unit 20. Mixer 58 can be operated in any one of several operating modes according to commands supplied through data bus 40. In a first-channel pass through mode, the resultant pixel value is simply the pixel value supplied through input 59. In a second channel pass through mode, the resultant pixel value is simply the pixel value supplied input 61.

In a first-channel alpha weighted mixing mode, each of the red, green and blue bytes in the resultant pixel value is the sum of two components. The first component is given by the corresponding byte in the pixel value supplied through the first input 59 multiplied by the alpha value included in that pixel value, whereas the second component is equal to corresponding byte in the pixel value supplied through second input 61 multiplied by 1 minus the alpha value included in the pixel value supplied through first input 59. Stated another way, each byte in the resultant pixel value in this mode of operation represents a weighted average of the corresponding bytes supplied through inputs 59 and 61, with the alpha value of the pixel value supplied through the first input 59 being the weighting factor.

In a second channel alpha weighting mode, the resultant pixel is derived in the same way except that the alpha value of the pixel valve sent through second input 61 is used as the weighting factor. That is, each byte in the resultant pixel supplied through output 60 is the sum of two components, a first component equal to the corresponding byte in the pixel supplied through second input 61 multiplied by the alpha value of that pixel value, and a second component equal to the corresponding byte in the pixel value supplied through first input 59 multiplied by 1 minus the alpha value in the pixel supplied through second input 61. In either of these two mixing modes, the alpha value of the resultant pixel is arbitrarily set to one or to some other value supplied through data bus 40.

In other mixing modes, an arbitrarily selected weighting factor supplied through data bus 40 is applied to derive output pixel value bytes as weighted averages of pixel value bytes supplied through inputs 59 and 61. The output from mixer 60 is connected to a gamma memory or color correction device 62. Color correction device 62 is arranged to convert input pixel values supplied thereto into output pixel values using a lookup table. That is, device 62 is preprogrammed with a conversion table correlating input pixel values with desired output pixel values. Each input pixel value is used to retrieve the desired output pixel value from the table. Color correction device 62 is a standard element of digital video processing equipment, normally used to correct for differences in the response characteristics of cameras, monitors or other signal processing equipment. As color correction device 62 is an element well known to those skilled in the art, its structure and function need not be described further herein.

The output of color correction device 62 is connected to the input connection 64 of a buffer 66. Buffer 66 itself may be a conventional device or device array arranged to accept pixel values in sequential order through input, connection 64 and to discharge these pixel values in the same order at an output connection 68. Buffer 66 has an output connection 68. The buffer includes a first in first out register 70 having capacity to store at least one full line of pixel values, i.e., 1920 pixel values. Buffer 66 further includes an intake or writing device 72 for accepting pixel values as supplied through input 64, and writing one such pixel value into register 70 for each input pixel clock signal of timing device 20. Buffer 66 further includes a reading device 74 arranged to read pixel values from register 66 responsive to the output clock signals generated by timing device 20 as discussed further below. Writing device 72, register 70 and reading device 74 are arranged so that pixel values pass through buffer 66 in the same order as they arrived via input 64. In principle, register 66 can be built as a single register having the requisite storage capacity and data throughput rate. However, it is generally more practical to build register 70 as an assemblage of plural first in, first out registers in parallel, and to arrange writing device 72 and reading device 74 so as to write into these registers in alternating sequence and read out from the registers in the same alternating sequence.

The output connection 68 of buffer assembly 66 constitutes the digital signal output of the system. Output 68 is connected to a digital to analog convertor 80, which in turn is arranged to accept pixel values in synchronism with the output clock signals from timing device 20 and to convert each of the bytes in each such pixel value into corresponding analog voltages, and to supply these analog voltages on red, green, blue and alpha channel outputs 82 constituting the analog output of the system. A synchronization pulse synthesizer 84 is connected to the analog output of the system. Synthesizer 84 is arranged to generate an analog vertical synchronization pulse in accordance with the applicable SMPTE standard in response to an output start-of-field signal generated by timing device 20, and to generate an analog horizontal synchronization pulse in response to an output state-of-line signal from timing device 20. Synthesizer 20 can be selectively enabled or disabled by a switch (not shown).

In one method of operation, a four-channel analog composite video signal of 1125/60 type from a camera C or another source is connected to analog input 10. The incoming signal is a 4 channel composite signal, and includes vertical and horizontal synchronization pulses in accordance with the SMPTE standard. The analog output 82 of the system is connected to a video monitor or other signal-using device M. Monitor M and Camera C are both connected to a common synchronization or genlock signal from a genlock source G and hence are approximately in synchronization with one another. Thus, both devices operate at the same line and field frequencies, and the fields and lines of the camera and monitor start at approximately the same time. However, because of delays induced by lead lengths and other signal processing components intervening between the genlock source and the camera and between the camera and the monitor, the actual signal from the camera may lag behind the timing of the monitor by an appreciable amount, typically less than one horizontal line.

Sync separator 12 delivers vertical synchronization pulses in predetermined time relation with the vertical synchronization pulses of the incoming signal and horizontal synchronization pulses in predetermined time relation with the horizontal synchronization pulses of the incoming analog signal. Timing unit 20 provides the first or input pixel clock signal as discussed above so that this pixel clock signal recurs on a regular, pixel clock cycles with a predetermined number of pixel clock cycles, preferably 1920 pixel clock cycles occurring during each line of actual video information in the incoming analog signal. As discussed above the timing unit disables the pixel clock signal for a predetermined number of pixel clock cycles corresponding to each horizontal blanking interval of the incoming signal, and for a predetermined number of pixel clock cycles corresponding to the vertical blanking intervals of the incoming signal. Analog to digital convertor 18 samples the incoming signal only in response to the pixel clock signal and hence samples the incoming signal only during the actual, active video and not during the horizontal and vertical blanking intervals. The analog to digital convertor produces a series of pixel values representing the active video in the signal.

In the mode depicted in FIG. 1, control microprocessor 44 has actuated switches 24, 28 and 32 to disconnect black signal generator 26 from the system, to connect the system digital signal input 19 to the downstream portion 30 of first branch 21 of the pixel value bus and to connect first frame memory 34 to the downstream portion 30 of the first branch, thus routing the pixel values to the read/write means 38 of the first frame memory. Control computer 44 has further actuated switches 46, 50 and 56 to disconnect black signal generator 48 and second frame memory 54 from the system, while also routing pixel values from system digital input 19 to the downstream portion 52 of the second branch 22 of the pixel value bus. Mixer 58 is set by the control computer 44 to its second input pass through mode in which the pixel values arriving at the second input 61, via the second branch 22 of the pixel value bus are simply passed through the mixer, and through color correction device 62 to the input connection 64 of buffer 66. The input or writing device 72 of buffer 66 receives the input pixel clock signal from timing device 20 and loads one pixel value into register 70 upon each input pixel clock signal, whereas reading device 74 receives the output clock signal from "timing device 20.

As discussed above, the input pixel clock signals resume immediately after each vertical blanking interval in the incoming signal, whereas the output clock signals start after the arbitrarily selected delay. During the first pixel clock cycles following the end of a vertical blanking interval in the incoming signal, while the pixel values for at least part of the first line of a field are clocked into register 66, the output clock signal is inactive and hence reading device 74 does not discharge any pixel values from register 66. The pixel values therefore accumulate in register 66. This condition continues until a number of pixel clock cycles equal to the arbitrarily selected delay time have elapsed. At this time, the output clock signal starts, and reading device 74 begins to read out pixel values, one on each pixel clock cycle. These pixel values are then converted to 4 channel analog video information by D/A convertor 80. In this condition, register 66 always holds a number of pixel values equal in number to the arbitrarily selected delay number of pixel clock cycles. Although new pixel values continue to arrive and old pixel values are continually read out, each pixel value is delayed by the arbitrarily selected delay number of pixel clock cycles in passing from input connection to output connection 68.

This condition continues until the inception of the next vertical blanking interval in the incoming video, i.e., until the last pixel value of the last line in the field has been clocked into the system by A/D convertor 18 and clocked into register 66 by writing device 72. At this time, the pixel clock signal terminates, and no more pixel values are read into register 66. However, because the output clock signal governing reading device 20 is delayed relative to the pixel clock signal, the output clock signal continues for a number of pixel clock signals equal to the arbitrarily selected delay number. Accordingly, reading device 74 reads out the pixel values remaining in register 66 in uninterrupted sequence with the preceding pixel values, leaving register 66 empty. The same cycle of operations resumes once again at the end of the vertical blanking interval, i.e., at the inception of the next field. As will be appreciated, this cycle of operation causes the D/A convertor 80 to provide analog video signals corresponding to the active video information in the incoming video signals but delayed in time by an arbitrary amount equal to the arbitrarily selected delay time. The signals are devoid of the vertical synchronization pulses accompanying the incoming video signal. The synchronization pulses, however, are unnecessary where the signal-using device has its own preset timing, as does the monitor M.

The arbitrarily selected delay can be adjusted as desired by a technician observing the monitor M. The technician sends an appropriate command from the external computer 45 to the control computer 44. Upon such command, the control computer varies the arbitrarily selected delay beginning on the next field. Thus, the new delay time and delay number of pixel cycles are implemented immediately following the first vertical blanking interval after the command is received to change them. In this manner, the video signals from camera C can be adjusted into synchronization with the timing of monitor M. Devices for automatically detecting differences in H-phase synchronization between video signals are known. If desired, error signals from such a device could be used as the basis for adjusting the delay time so as to provide automatic feedback control.

During the foregoing operations, pixel values are continually clocked into the read/write register 38 of first frame memory 34 and continually stored the memory array 36. As discussed above, the read/write device 38 places incoming pixel values into preselected addresses on a cycle which repeats every two full fields, i.e., once every frame. Therefore, after two full fields have passed into the system, the new pixel values are continually written over previously stored pixel values, leaving only the last two fields in the memory. If the technician monitoring monitor M sees a scene which he wishes to capture or "freeze", he can issue an appropriate instruction through external computer 45, causing control computer 44 to open switch 32 and close switch 56 during the next vertical blanking interval, thus capturing or "freezing" a frame image in frame memory 34 and actuating memory 54 to continually store and overwrite subsequent frames. By entering appropriate commands via external computer 45, the technician can similarly freeze a frame in second frame memory 54.

While any frame is "frozen" in one of the frame memories, the technician can actuate external computer 45 to send and retrieve pixel values via control computer 44 and data bus 40 to any desired location within the memory, thereby modifying the frozen frame or transmitting the frozen frame to the external computer for use as a computer graphics file.

By entering a different command through computer 45, the technician can actuate first frame memory 34 to play back the frozen frame. Thus, control computer 44 opens switch 28 and commands read/write device 38 to enter a read mode. In this mode, the read/write device reads out pixel values in order, beginning with the first line of the first field in synchronism with the input pixel clock signal. As discussed above, the pixel clock signal is synchronized with the incoming video. Thus, active video information from frame memory 34 is supplied in exactly the same timing as the incoming pixel values supplied by A/D convertor 18. Thus, no pixel values are supplied during vertical blanking intervals of the incoming video signal, and the first pixel value of a field is read out from the memory is supplied in synchronism with the first pixel value of an incoming field. In this mode of operation, the frame read from the memory is supplied at the first input 59 of mixer 58, whereas the incoming video signal is supplied at the second input 61. These two streams of pixel values are in synchronism with one another. That is, the pixel values a given spot in the raster are supplied at the same time through both inputs. As discussed above, mixer 58 can be commanded, through external computer 45 and control computer 44 to mix these pixel values according to the alpha value of the pixel values read out from the first frame memory; or according to the alpha values of the pixel values in the incoming signals, or according to some arbitrary mixing constant which can be varied with time.

The resulting pixel values are processed through the color correction device 62 and delayed by an arbitrarily selected amount in buffer 66 the same manner as the pure incoming signals discussed above. In exactly the same way, a frame stored in second frame memory 54 can be read out and mixed with an incoming signal. In this case, switch 50 is opened and switch 56 is closed, so that signals from the second memory are supplied to the second input 61 of mixer 58. Switch 28 is closed to route incoming video to first input 59. Switch 32 may be opened to isolate first memory 34 or else may be closed if first memory 34 and its read/write device 38 are in a write mode, so that the incoming video is continually captured in the first memory.

Black signal generator 26 can be connected to the downstream portion 30 of the first branch 21 of the pixel value bus, and hence to the first input 59 of mixer 58. Mixer 58 can be actuated to apply a progressively varying arbitrary combination factor between the black or all zero pixel values supplied by source 26 and the video signal supplied through second input 61 (either from incoming video or from second memory 54) thereby providing a fade to or from black. Black source 48 is used in the same way to provide fade to black (or fade from black) with the video signal supplied through first input 59.

As discussed above, the outgoing analog video does not incorporate vertical or horizontal synchronization pulses, but instead includes only the active analog video with gaps between lines during the blanking intervals. If synchronization pulses are desired, synchronization pulse synthesizer 84 can be actuated to supply the same. The synchronization pulse synthesizer is triggered by output start-of-line and output start-of-field signals coordinated with the output clock signal used to control reading device 74 of buffer 66. As the arbitrary delay time used to delay the active video is changed by external commands, and hence the active video is retarded or advanced in time, the start and end of the synchronization pulses from synthesizer 84 will likewise be retarded or advanced. Stated another way, the time relationship between the active video information in the output of the system and the vertical synchronization pulses provided by synthesizer 84 is fixed.

As will be readily appreciated, numerous variations and combinations of the features discussed above can be utilized without departing from the present invention. Merely by way of example, one or another of the frame memories could be omitted. Also, additional frame memories can be included as desired. If desired, one or another of the frame memories could be replaced by a memory of lesser capacity, such as a memory having storage capacity for only some predetermined part of a frame. Desirably, if the system is used with an interlaced video system, such a smaller memory would be controlled so that the same portions of the raster in various fields are always stored in the memory. Such a smaller memory could be used to capture part of an image. Systems in accordance with the present invention could be used with externally supplied digital video signals rather than with incoming analog signals. In this event, the synchronization separator and analog digital convertor would be omitted. The timing device could be synchronized with a pixel clock signal of the incoming digital video signal. It is not essential that the incoming or outgoing video signals include an alpha channel. If the incoming signal does not incorporate an alpha channel, alpha values can be written into the appropriate locations in frame memories under the control of external computer 45 by data bus 40. Indeed, it is not essential that the frame memories include storage locations for alpha bytes in the various pixel values. Pixel values without alpha bytes can be mixed using arbitrarily selected mixing parameters, again supplied through data bus 40.

As these and other variations and combinations of the features discussed above can be utilized without departing from the present invention should be taken by way of illustration rather than by way of limitation of the present invention as defined by the claims.

What is claimed is:

1. A video frame storage and synchronization system for processing digital video signals including a series of pixel values arranged in fields in a preselected raster order, the system comprising:
   (a) a system digital input connection for accepting an incoming digital video signal;
   (b) a first memory;
   (c) first memory write means for writing pixel values into said first memory;
   (d) first memory read means for reading pixel values from said first memory to provide said pixels read from said first memory in said preselected raster order;
   (e) timing means for synchronizing said first memory read means with said incoming digital video signal so that each pixel value read from said first memory is provided simultaneously with the corresponding pixel value of a field in said incoming digital video signal;
   (f) digital buffer means having a buffer input and a buffer output for accepting successive pixel values in order as presented at said buffer input, discharging pixel values in the same order at said buffer output and providing a time delay between acceptance and discharge of each such pixel value;
   (g) means for adjusting said time delay provided by said digital buffer means; and
   (h) routing means for selectively routing digital video signals from said system digital input connection to said first memory write means, said buffer input or both, and for selectively routing digital video signals from said first memory read means to said buffer input.

2. A system as claimed in claim 1 wherein said first memory has capacity sufficient to store pixel values constituting a full frame of said digital video signal, said first memory read means being operative to read successive lines of pixels in said preselected order so that the pixels read out from said first memory are supplied as full frames, said timing means being operative to synchronize said first memory read means with the incoming video signal so that the first pixel value of each field read out from said first memory means is provided simultaneously with the first pixel value of a field in the incoming video signal.

3. A system as claimed in claim 2 wherein said first memory read means and said first memory write means are operative to read and write pixel values to and from locations within said first memory and to vary such locations according to a fixed ordered pattern such that said locations repeat in the same order within each frame of pixel values read and written.

4. A system as claimed in claim 2 wherein said first memory write means is operative to write successive pixel values into said first memory in blocks of successive pixel values and said first memory read means is operative to retrieve said blocks of pixel value and read out the pixel values in each such block seriatim.

5. A system as claimed in claim 2 wherein said timing means includes means for providing input timing signals in coordination with the timing of said incoming digital video signal and means for controlling operation of said first memory read means responsive to said input timing signals.

6. A system as claimed in claim 5 wherein said means for providing input timing signals includes means for providing a pixel clock signal on periodic pixel clock cycles.

7. A system as claimed in claim 6 wherein said means for providing said pixel clock signal includes means for inhibiting said pixel clock signal during preselected intervals.

8. A system as claimed in claim 7 wherein said buffer means includes a register, means for writing a pixel value from said buffer input into said register responsive to said pixel clock signal, means for reading the earliest-written pixel value from said register to said buffer output responsive to an output clock signal, said timing means including means for providing said output clock signal at said preselected time delay relative to said pixel clock signal.

9. A system as claimed in claim 8 in which said timing means includes means for accepting an external timing signal and controlling said timing means responsive to said external timing signal.

10. A system as claimed in claim 9 further comprising analog-to-digital conversion means for accepting video signals in analog form, converting said analog signals to a stream of digital pixel values in synchronism with said pixel clock signal and supplying said series of pixel values to said system digital input connection.

11. A system as claimed in claim 10 wherein said means for accepting an external timing signal includes means for detecting a synchronization signal incorporated in said analog video signals.

12. A system as claimed in claim 11 wherein said analog-to-digital conversion means includes means for accepting parallel analog signals representing plural colors and converting said parallel analog signals to pixel values so that each pixel value incorporates a plurality of bytes representing plural colors in one pixel.

13. A system as claimed in claim 1 wherein said routing means includes a mixer having a plurality of mixer inputs and means for mixing pixel values supplied to said mixer inputs with one another to obtain combined pixel values and supplying said combined pixel values to said buffer input, and means for selectively routing pixel values from said system digital input connection and said first memory read means to said mixer inputs.

14. A system as claimed in claim 13 further comprising a second memory, second memory write means for writing pixel values into said second memory and second memory read means for reading pixel values from said second memory, said routing means including means for selectively routing digital video signals from said system digital input connection to said second memory write means and from said second memory read means to one of said mixer inputs.

15. A system as claimed in claim 2 further comprising first memory random write means for accepting pixel values and write address data denoting locations within said first memory and writing pixel values into said first memory at the location denoted by said write address data.

16. A system as claimed in claim 15 further comprising first memory random read means for accepting read address data and retrieving a pixel value from locations in said first memory denoted by said read address data.

17. A system as claimed in claim 16 further comprising a data bus, said first memory random write and random read means being operative to accept and deliver said address data and pixel values on said bus.

18. A method of processing digital video signals including a series of pixel values arranged in fields in a preselected raster order, the method comprising the steps of:
 (a) accepting an incoming digital video signal;
 (b) writing pixel values of the incoming digital video signal into a first memory;
 (c) reading pixel values from said first memory in said preselected raster order;
 (d) synchronizing said reading step with said incoming digital video signal so that each pixel value read from said first memory is provided simultaneously with the corresponding pixel value of a field in said incoming digital video signal;
 (e) selectively routing pixel values of said incoming digital video signal to said first memory, to a buffer input or both, and selectively routing pixel values read from said first memory to said buffer input;
 (f) accepting successive pixel values in order as presented at said buffer input, discharging pixel values in the same order at a buffer output and providing a time delay between acceptance and discharge of each such pixel value; and
 (g) adjusting said time delay.

19. A method as claimed in claim 18 wherein said writing step includes the step of writing pixel values constituting a full frame of said digital video signal into said first memory, said reading step includes the step of reading successive lines of pixels in preselected order so that the pixel values read out from said first memory are supplied as full fields, said synchronizing step being performed so that the first pixel value of each field read out from said first memory means is provided simultaneously with the first pixel value of a field in the incoming video signal.

20. A method as claimed in claim 19 wherein said reading and writing steps are performed so as to read and write pixel values to and from locations within said first memory and to vary such locations according to a fixed ordered pattern such that said locations repeat in the same order within each frame of pixel values read and written.

21. A method as claimed in claim 19 wherein said synchronizing step includes the steps of providing input timing signals in coordination with the timing of said incoming digital video signal and controlling of said reading steps responsive to said input timing signals.

22. A method as claimed in claim 21 wherein said step of providing input timing signals includes the step of providing a pixel clock signal on periodic pixel clock cycles.

23. A method as claimed in claim 22 wherein said step of providing said pixel clock signal includes the step of inhibiting said pixel clock signal during preselected intervals.

24. A system as claimed in claim 23 wherein said step of providing a time delay includes the steps of writing a pixel value from said buffer input into a register responsive to said pixel clock signal, providing an output clock signal at said preselected time delay relative to said pixel clock signal and reading the earliest-written pixel value from said register to said buffer output responsive to said output clock signal.

25. A method as claimed in claim 23 further comprising the steps accepting video signals in analog form and converting said analog signals to a stream of digital pixel values in synchronism with said pixel clock signal to thereby provide said incoming digital video signal, said step of providing input timing signals including the step of detecting a synchronization signal incorporated in said analog video signals.

26. A method as claimed in claim 18 wherein said routing step includes the step of selectively mixing pixel values in said incoming digital video signal with pixel values read from said first memory and supplying said combined pixel values to said buffer input.

27. A method as claimed in claim 19 further comprising the step of selectively modifying pixel values stored in said first memory.

* * * * *